US012742471B2

(12) United States Patent
Tseng et al.

(10) Patent No.: US 12,742,471 B2
(45) Date of Patent: Sep. 22, 2026

(54) CAPTIVE SCREW

(71) Applicant: COOLER MASTER CO., LTD., Taipei City (TW)

(72) Inventors: Hsiang-Chieh Tseng, Taipei City (TW); Zhida Chen, Taipei City (TW)

(73) Assignee: COOLER MASTER CO., LTD., Taipei City (TW)

( * ) Notice: Subject to any disclaimer, the term of this patent is extended or adjusted under 35 U.S.C. 154(b) by 502 days.

(21) Appl. No.: 18/239,407

(22) Filed: Aug. 29, 2023

(65) Prior Publication Data

US 2024/0410413 A1 Dec. 12, 2024

(30) Foreign Application Priority Data

Jun. 12, 2023 (CN) ........................ 202321488582.3

(51) Int. Cl.
*F16B 41/00* (2006.01)
*F16B 5/02* (2006.01)

(52) U.S. Cl.
CPC .......... *F16B 41/002* (2013.01); *F16B 5/0208* (2013.01); *Y10S 411/999* (2013.01)

(58) Field of Classification Search
CPC ... F16B 41/002; F16B 5/0208; Y10S 411/999
USPC .......................................... 411/352, 353, 999
See application file for complete search history.

(56) References Cited

U.S. PATENT DOCUMENTS 2,376,089 A * 5/1945 Savageau .............. F16B 41/005 411/932
2,625,721 A * 1/1953 Lockhart ................ B65D 45/32 24/19
2,639,179 A * 5/1953 Phelps ................ E05B 65/0057 411/968
3,180,389 A * 4/1965 Frank .................... F16B 5/0208 411/968
3,465,803 A * 9/1969 Swanstrom ........... F16B 41/002 411/968
5,082,407 A * 1/1992 Mickiewicz .......... F16B 41/002 411/352
6,468,012 B2 * 10/2002 Ellis ...................... F16B 5/0208 411/970
6,685,409 B2 * 2/2004 Braun .................. F16B 35/041 411/353
6,872,040 B2 * 3/2005 Deeg ..................... F16B 41/002 411/353

(Continued)

*Primary Examiner* — Nicholas L Foster
(74) *Attorney, Agent, or Firm* — Merchant & Gould P.C.

(57) ABSTRACT

A captive screw includes a sleeve and a screwing member. The sleeve includes a body portion and a positioning protrusion. The positioning protrusion protrudes from the body portion, and forms a channel. The screwing member includes a head portion, a neck portion and a threaded portion. The neck portion connects the head portion and the threaded portion. The neck portion passes through the channel. The head portion and the threaded portion are located on the positioning protrusion. The threaded portion includes a wider section and a narrower section. The wider section is connected to the neck portion. The narrower section is connected to the wider section. The diameter of the channel is less than a major diameter of the wider section. The diameter of the channel is greater than or equal to a major diameter of the narrower section and a minor diameter of the wider section.

10 Claims, 9 Drawing Sheets

(56) References Cited

U.S. PATENT DOCUMENTS 7,179,037 B2 * 2/2007 Aukzemas ............ F16B 41/002 411/352
7,278,809 B2 * 10/2007 Aukzemas ............ F16B 41/002 411/432
8,202,031 B2 * 6/2012 Hartmann ............ F16B 41/002 411/383
8,371,786 B2 * 2/2013 Chiu .................... F16B 5/0208 411/551
8,388,288 B2 * 3/2013 Chiu .................... F16B 5/0208 411/107
9,206,834 B2 * 12/2015 Tseng .................... F16B 5/0208
9,347,471 B2 * 5/2016 Tseng .................... F16B 5/0208
10,113,581 B2 * 10/2018 Hutchings ............... F16B 4/004
10,400,809 B2 * 9/2019 Uchiyama ............. F16B 41/002
10,626,621 B2 * 4/2020 Polk, Jr. ................ F16B 5/0088
10,823,222 B2 * 11/2020 Hübner ................. F16B 5/0258
11,466,722 B2 * 10/2022 Tseng .................... F16B 5/0208
12,055,175 B2 * 8/2024 Wu ....................... F16B 5/0208
12,055,177 B2 * 8/2024 Phan ..................... F16B 5/0266
12,173,746 B2 * 12/2024 Wu ....................... F16B 5/0266
12,422,086 B2 * 9/2025 Chen ..................... F16B 5/0266
2002/0106258 A1 * 8/2002 Braun ................... F16B 35/041 411/353
2003/0194292 A1 * 10/2003 Deeg ..................... F16B 41/002 411/353
2004/0165966 A1 * 8/2004 Aukzemas ............ F16B 41/002 411/353
2004/0240962 A1 * 12/2004 Teng ..................... F16B 5/0208 411/353
2007/0071574 A1 * 3/2007 Aukzemas .............. F16B 39/28 411/353
2009/0136318 A1 * 5/2009 Hartmann ............. F16B 41/002 411/353
2009/0313804 A1 * 12/2009 Wang .................... F16B 41/002 29/525.11
2010/0111637 A1 * 5/2010 Wang .................... F16B 5/0208 411/111
2012/0040035 A1 * 2/2012 Chiu ..................... F16B 5/0208 425/110
2012/0057947 A1 * 3/2012 Chiu ..................... F16B 5/0208 411/105
2012/0170993 A1 * 7/2012 Chiu ..................... F16B 5/0208 411/350
2012/0224935 A1 * 9/2012 Chiu ..................... F16B 5/0208 411/352
2012/0251265 A1 * 10/2012 Chiu ..................... F16B 5/0208 411/349
2014/0068921 A1 * 3/2014 Tseng .................... F16B 5/0208 29/525.02
2015/0147133 A1 * 5/2015 Tseng .................... F16B 5/0208 411/132
2015/0260216 A1 * 9/2015 Tseng ...................... F16B 39/02 411/103
2018/0073544 A1 * 3/2018 Uchiyama ............... F16B 33/02
2018/0172059 A1 * 6/2018 Hutchings ............. F16B 41/002
2019/0003520 A1 * 1/2019 Hübner ................. F16B 5/0258
2019/0257093 A1 * 8/2019 Polk, Jr. ................ F16B 41/002
2021/0310506 A1 * 10/2021 Phan ..................... F16B 41/002
2022/0290713 A1 * 9/2022 Tseng .................... F16B 5/0225
2023/0340978 A1 * 10/2023 Wu ....................... F16B 5/0208
2023/0375032 A1 * 11/2023 Wu ....................... F16B 41/002
2024/0384828 A1 * 11/2024 Chen ..................... F16B 5/0266

* cited by examiner

CAPTIVE SCREW

CROSS-REFERENCE TO RELATED APPLICATIONS

This non-provisional application claims priority under 35 U.S.C. § 119(a) on Patent Application No(s). 202321488582.3 filed in China, on Jun. 12, 2023, the entire contents of which are hereby incorporated by reference.

TECHNICAL FIELD

The present disclosure relates to a screw, more particularly to a captive screw.

BACKGROUND

Generally, two plates may be assembled via screws. Specifically, after aligning screw holes of the two plates, the users can assemble the two plates via screwing screws into the screw holes. On the contrary, the users can remove the screws from the screw holes to disassemble the two plates from each other.

Since the screws are lightweight and have small volume, the screws may be inadvertently lost easily during the assembly or disassembly of the two plates. Thus, the users may also assemble the two plates via captive screws consisting of sleeves and screws to prevent such issue. In detail, after the sleeves of the captive screws are fixed to one of the plates, the two plates are assembled via the screws partially disposed in the sleeves. When the users disassemble the two plates, the screws may be kept in the sleeve and lost since the screws are partially disposed in the sleeves. However, structures of the conventional captive screws are complicated, such that the steps of assembling the captive screws are also complicated. In addition, the conventional screws may still have a risk of being detached from the sleeve, thereby causing inconvenience for assembling captive screws. Therefore, how to simplify the structure of the captive screw so as to facilitate the assembly of the captive screws while preventing the screwing member of the captive screw from being lost due to the detachment from the sleeve is an important issue to be solved.

SUMMARY

The present disclosure provides a captive screw having simplified structure to facilitate the assembly thereof while preventing the screwing member from being lost due to the detachment from the sleeve.

One embodiment of the disclosure provides a captive screw including a sleeve and a screwing member. The sleeve includes a body portion and at least one positioning protrusion. The body portion has an inner surface. The inner surface surrounds and forms an accommodating space. The at least one positioning protrusion protrudes from the inner surface, and forms a channel. A diameter of the channel is less than a diameter of the accommodating space. The screwing member includes a head portion, a neck portion and a threaded portion. The neck portion connects the head portion and the threaded portion. A diameter of the neck portion is less than a diameter of the head portion and the diameter of the channel. The neck portion passes through the channel. The head portion and the threaded portion are located on two opposite sides of the at least one positioning protrusion, respectively. The threaded portion includes a wider section and a narrower section. The wider section is connected to the neck portion. The narrower section is connected to the wider section. The diameter of the channel is less than a major diameter of the wider section. The diameter of the channel is greater than or equal to a major diameter of the narrower section and a minor diameter of the wider section.

According to the captive screw as described in the above embodiments, the wider section of the screwing member passes through the channel, and the diameter of the channel is less than the major diameter of the wider section. Therefore, the screwing member can be prevented from being detached from the sleeve via an aforementioned size design without installing additional blocking components. Accordingly, a structure of the captive screw can be simplified so as to facilitate assembly of the captive screw while preventing the screwing member from being lost due to the detachment from the sleeve.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1:
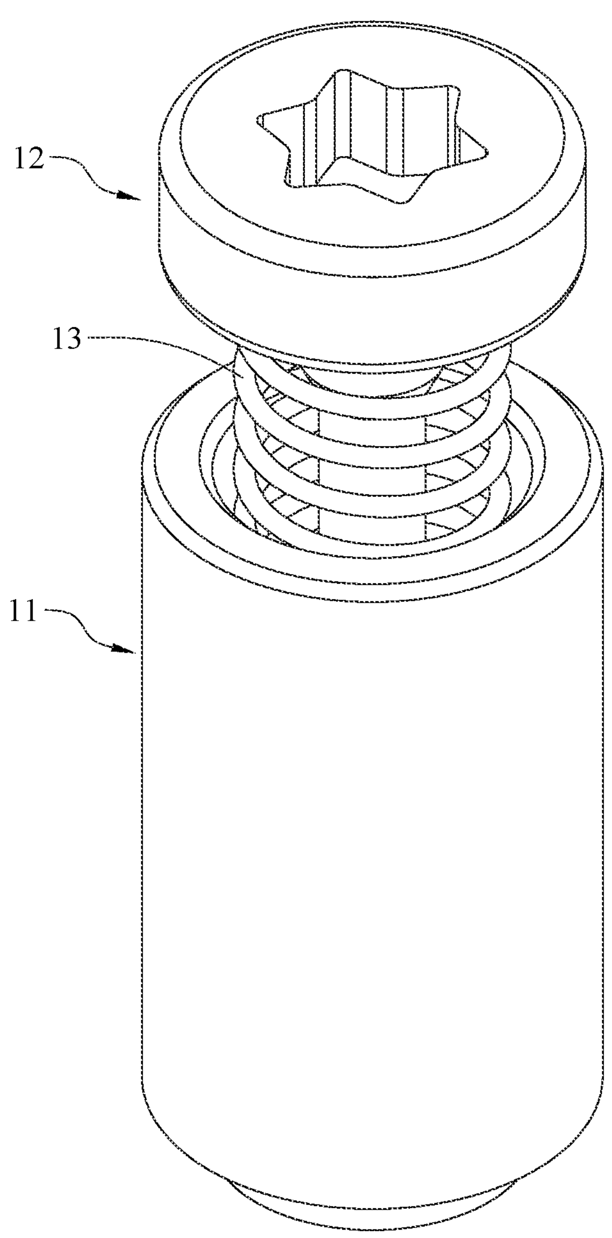
FIG. 1 is a perspective view of a captive screw in accordance with a first embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

Figure 2:
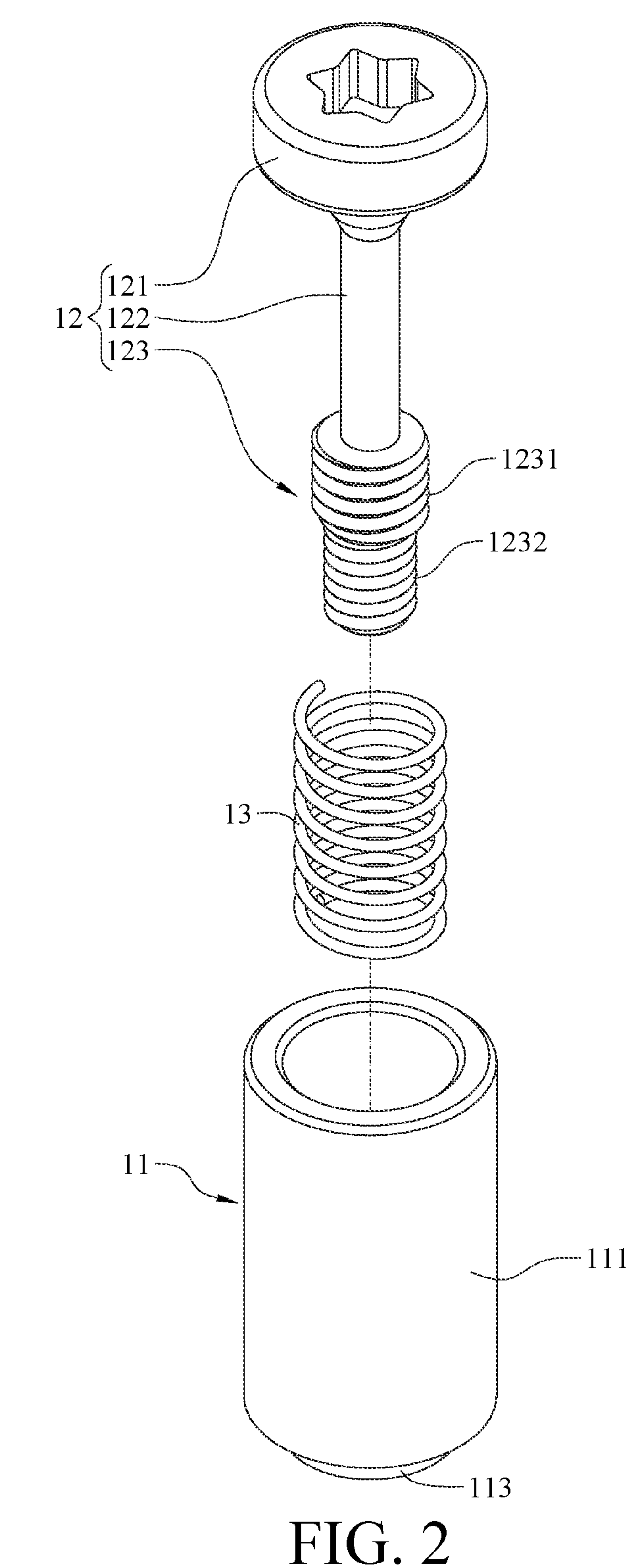
FIG. 2 is an exploded view of the captive screw in FIG. 1.
Figure 3:
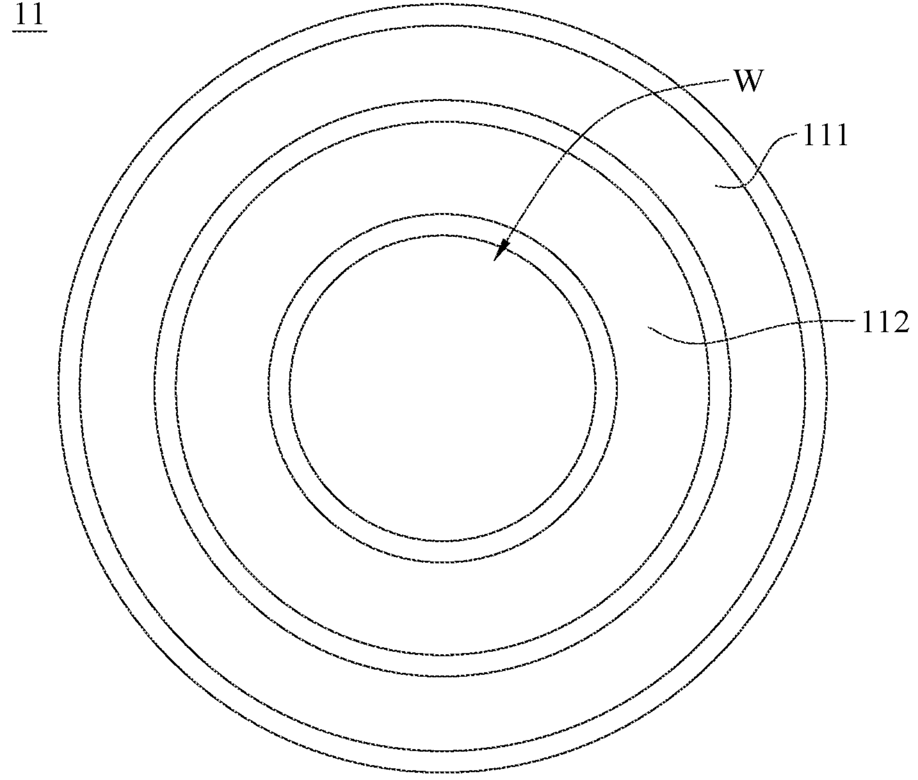
FIG. 3 is a top view of a body portion of the captive screw in FIG. 1.

Please refer to FIG. 1 to FIG. 3, where FIG. 1 is a perspective view of a captive screw 10 in accordance with a first embodiment of the disclosure, FIG. 2 is an exploded view of the captive screw 10 in FIG. 1, and FIG. 3 is a top view of a body portion 111 of the captive screw 10 in FIG. 1.

Figure 4:
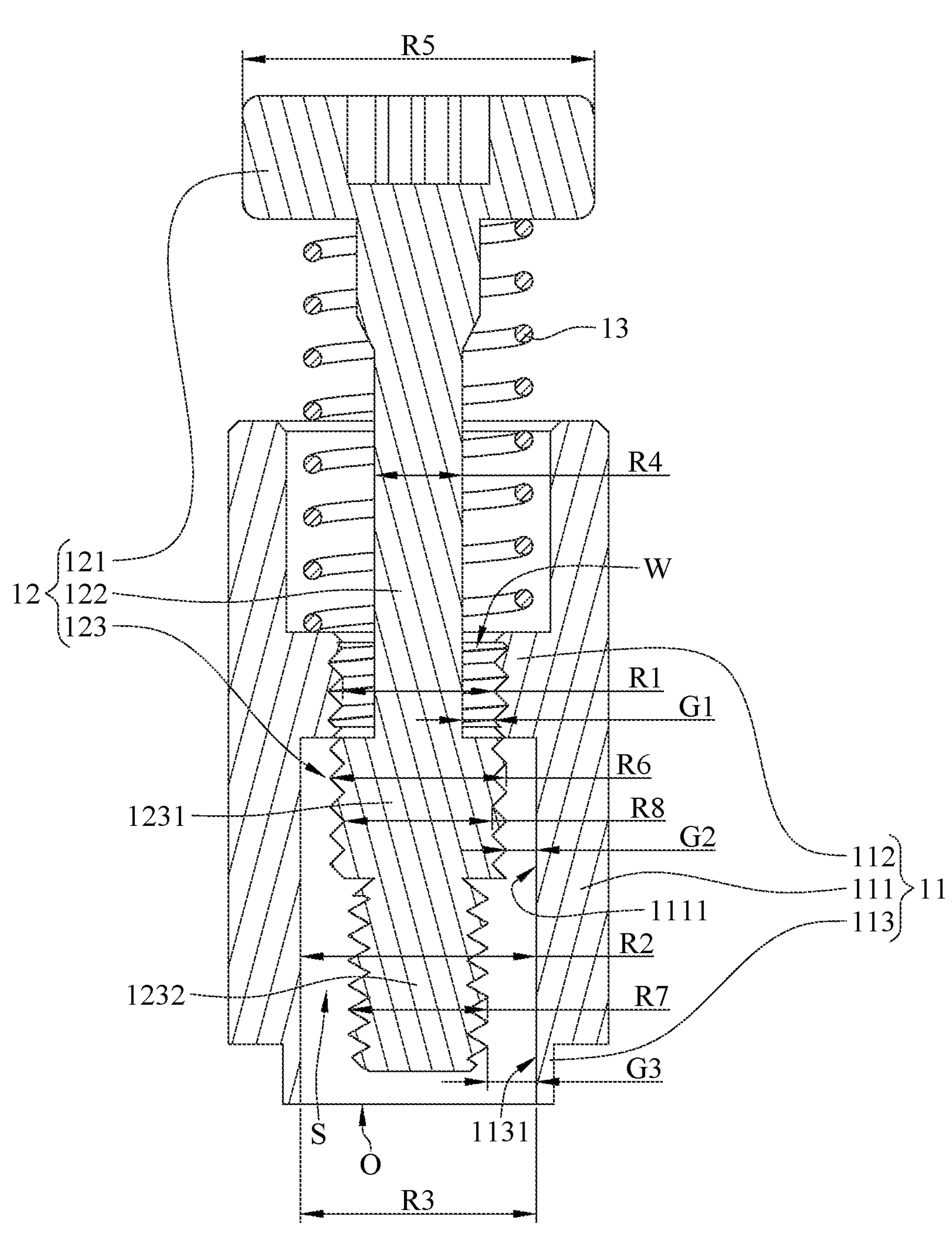
FIG. 4 is a cross-sectional view of the captive screw in FIG. 1.

In this embodiment, the captive screw 10 includes a sleeve 11 and a screwing member 12. Please refer to FIG. 1 to FIG. 4, where FIG. 4 is a cross-sectional view of the captive screw 10 in FIG. 1. The sleeve 11 includes the body portion 111, a positioning protrusion 112 and a mounting portion 113. The body portion 111 has an inner surface 1111. The inner surface 1111 surrounds and forms an accommodating space S. The positioning protrusion 112 is, for example, annular. The positioning protrusion 112 protrudes from the inner surface 1111, and forms a channel W therein. The channel W is, for example, a screw hole. A diameter R1 of the channel W is less than a diameter R2 of the accommodating space S. The mounting portion 113 is connected to a side of the body portion 111, and is configured to be mounted on a plate (not shown). The mounting portion 113 has an inner surface 1131, and is, for example, annular. The inner surface 1131 surrounds and forms an opening O. A diameter R3 of the opening O is, for example, equal to the diameter R2 of the accommodating space S.

The screwing member 12 is, for example, a screw, and is configured to be screwed to another plate (not shown). The screwing member 12 includes a head portion 121, a neck portion 122 and a threaded portion 123. The neck portion 122 connects the head portion 121 and the threaded portion 123. A diameter R4 of the neck portion 122 is less than a diameter R5 of the head portion 121 and the diameter R1 of the channel W. The neck portion 122 passes through the channel W. The head portion 121 and the threaded portion 123 are located on two opposite sides of the positioning protrusion 112, respectively. The threaded portion 123 includes a wider section 1231 and a narrower section 1232 that are connected to each other. The wider section 1231 is connected to the neck portion 122. The narrower section 1232 is connected to the wider section 1231. The diameter R1 of the channel W is less than a major diameter R6 of the wider section 1231, and is greater than or equal to a major diameter R7 of the narrower section 1232 and a minor diameter R8 of the wider section 1231. Accordingly, after the wider section 1231 of the screwing member 12 passes through the channel W via a screwing method so as to screw the screwing member 12 into the sleeve 11, the screwing member 12 cannot be detached from the sleeve 11. For example, the channel W and the wider section 1231 of the threaded portion 123 are conform to M5 specification, and the narrower section 1232 of the threaded portion 123 is conform to M4 specification. In addition, the channel may be a screw hole without a threaded.

In this embodiment, the neck portion 122 and the positioning protrusion 112 are spaced apart from each other by a first distance G1. The wider section 1231 and the inner surface 1111 are spaced apart from each other by a second distance G2. The narrower section 1232 and the inner surface 1131 are spaced apart from each other by a third distance G3. The first distance G1, the second distance G2 and the third distance G3 are, for example, greater than or equal to 0.5 millimeters (mm). For example, the first distance G1 is 0.9 mm, the second distance G2 is 0.85 mm, and the third distance G3 is greater than 0.85 mm. Accordingly, the screwing member 12 can be maintained in a floating state via the distances G1-G3 when it is not screwed on the plate. That is, the screwing member 12 is movable relative to the sleeve 11 without being detaching from the sleeve 11.

In this embodiment, the captive screw 10 further includes a restoring member 13. The restoring member 13 is sleeved on the neck portion 122 of the screwing member 12, and two opposite sides of the restoring member 13 are connected to the head portion 121 of the screwing member 12 and the positioning protrusion 112 of the sleeve 11, respectively. Thus, after the screwing between the screwing member 12 and the plate 30 is released, the restoring member 13 can force the head portion 121 to be moved away from the positioning protrusion 112.

In this embodiment, the sleeve 11 includes one positioning protrusion 112, and the positioning protrusion 112 is annular, but the disclosure is not limited thereto. In other embodiments, the sleeve may include two or more positioning protrusions, and the positioning protrusions may be arranged in an annular array.

Figure 5:
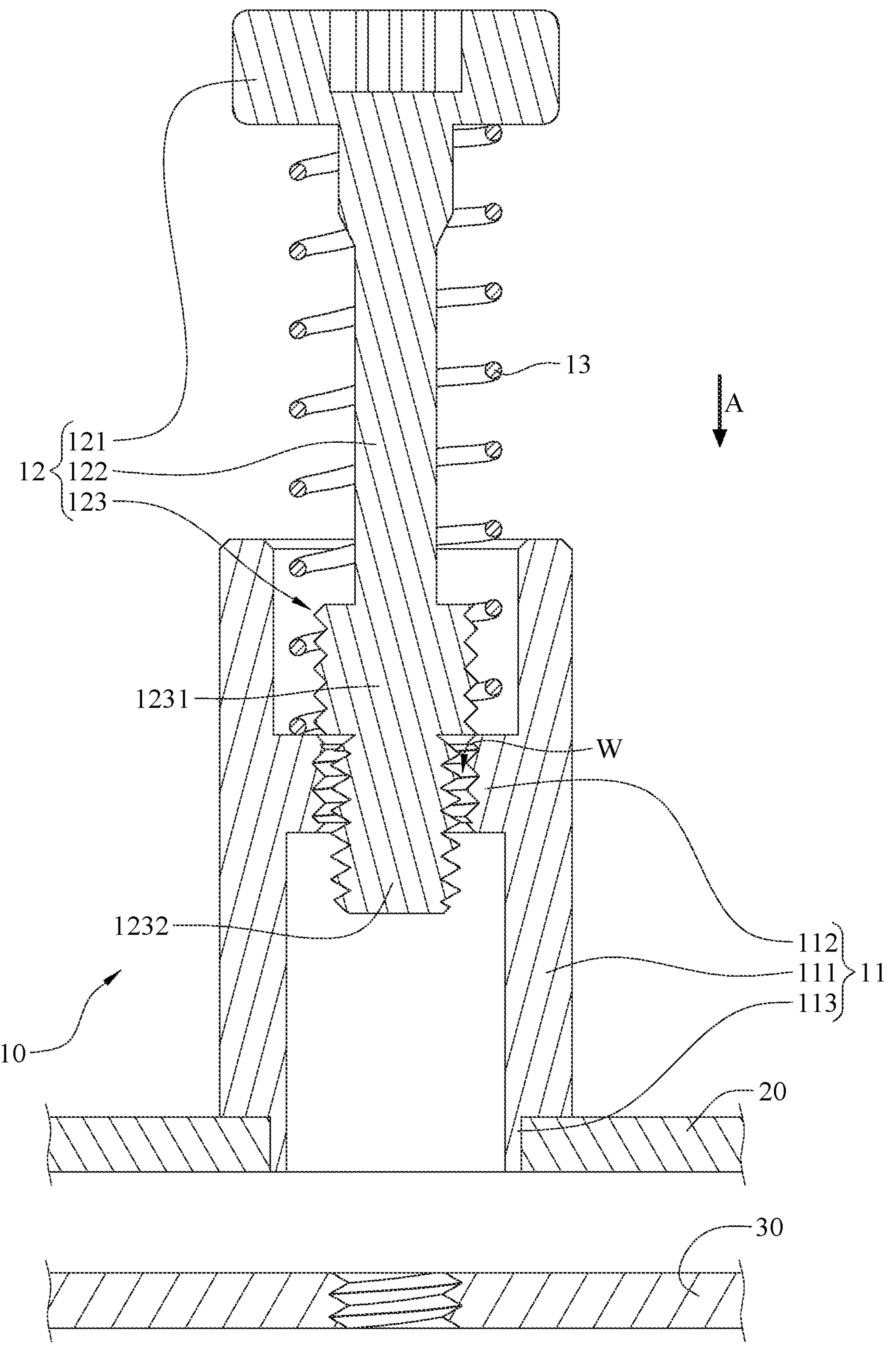
FIG. 5 is a cross-sectional view showing that a wider section of a screwing member of the captive screw does not pass through a positioning protrusion of a sleeve of the captive screw in FIG. 1.
Figure 6:
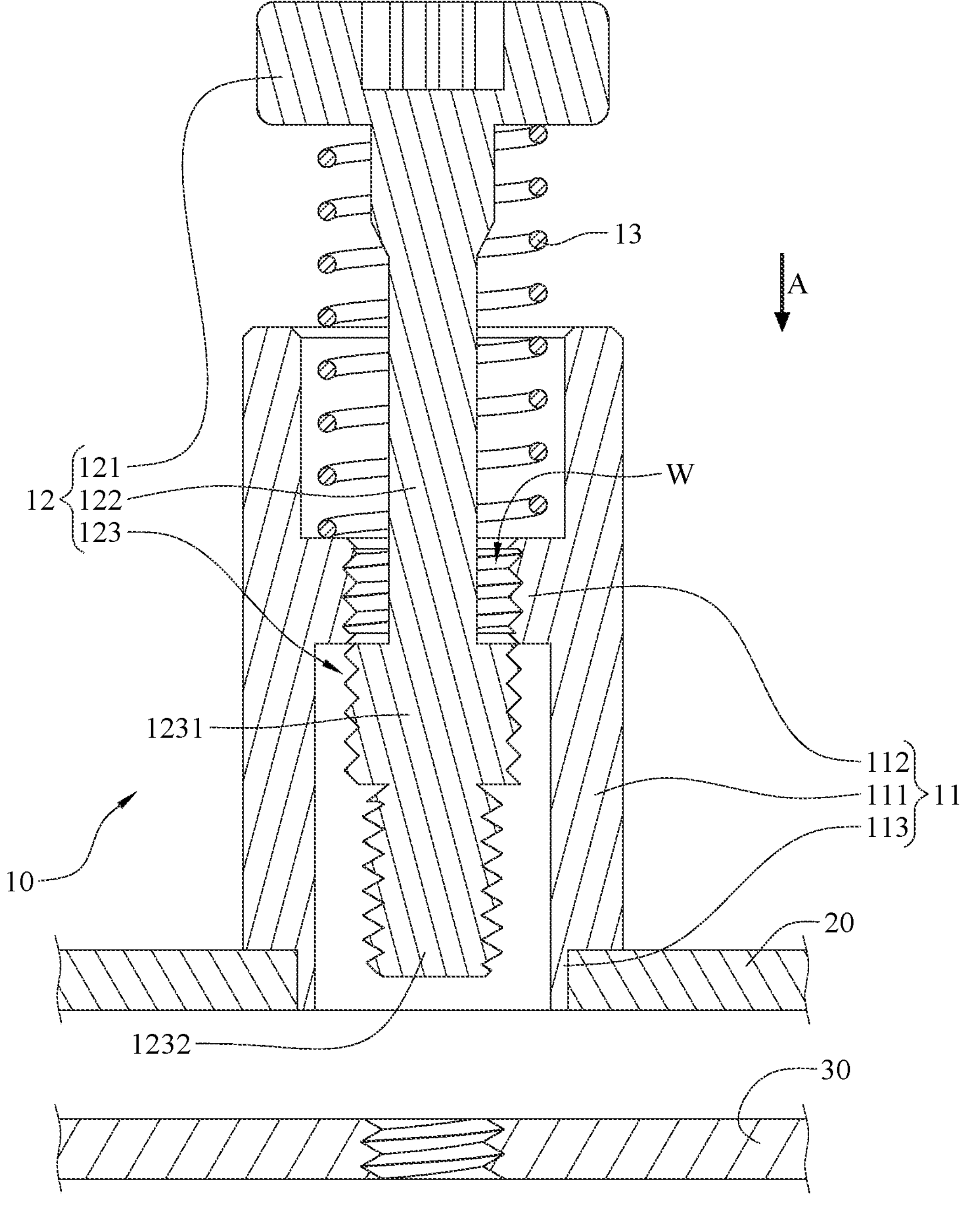
FIG. 6 is a cross-sectional view showing that the wider section of the screwing member of the captive screw passes through the positioning protrusion of the sleeve of the captive screw in FIG. 1.
Figure 7:
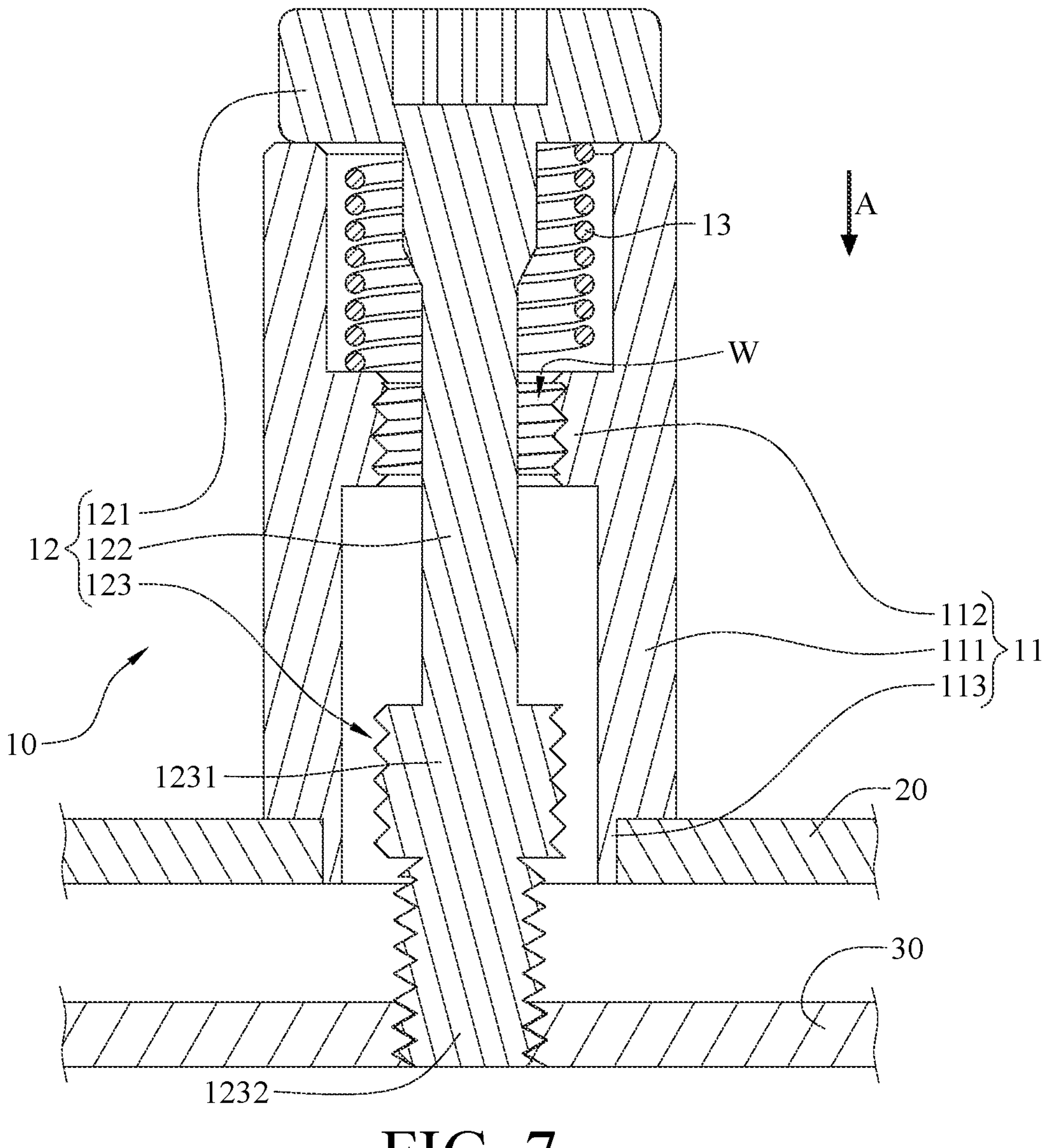
FIG. 7 is a cross-sectional view showing that the captive screw in FIG. 1 is screwed on plates.

Please refer to FIG. 5 to FIG. 7, where FIG. 5 is a cross-sectional view showing that the wider section 1231 of the screwing member 12 of the captive screw 10 does not pass through the positioning protrusion 112 of the sleeve 11 of the captive screw 10 in FIG. 1, FIG. 6 is a cross-sectional view showing that the wider section 1231 of the screwing member 12 of the captive screw 10 passes through the positioning protrusion 112 of the sleeve 11 of the captive screw 10 in FIG. 1, and FIG. 7 is a cross-sectional view showing that the captive screw 10 in FIG. 1 is screwed on plates 20, 30.

In this embodiment, when two plates 20 and 30 are needed to be assembled via the captive screw 10, the screwing member 12 is firstly placed into the sleeve 11 disposed on the plate 20 along a direction A. Then, the wider section 1231 of the screwing member 12 passes through the channel W via a screwing method so as to screw the screwing member 12 into the sleeve 11. Finally, the screwing member 12 is screwed into the plate 30. Accordingly, the two plates 20 and 30 can be assembled via the captive screw 10.

On the contrary, the two plates 20 and 30 can be disassembled merely by releasing the screwing between the screwing member 12 and the plate 30. Since the diameter R1 of the channel W is less than the major diameter R6 of the wider section 1231 of the screwing member 12, the wider section 1231 cannot pass through the channel W along a direction opposite to the direction A. Therefore, the screwing member 12 is kept on instead of being detached from the sleeve 11.

Figure 8:
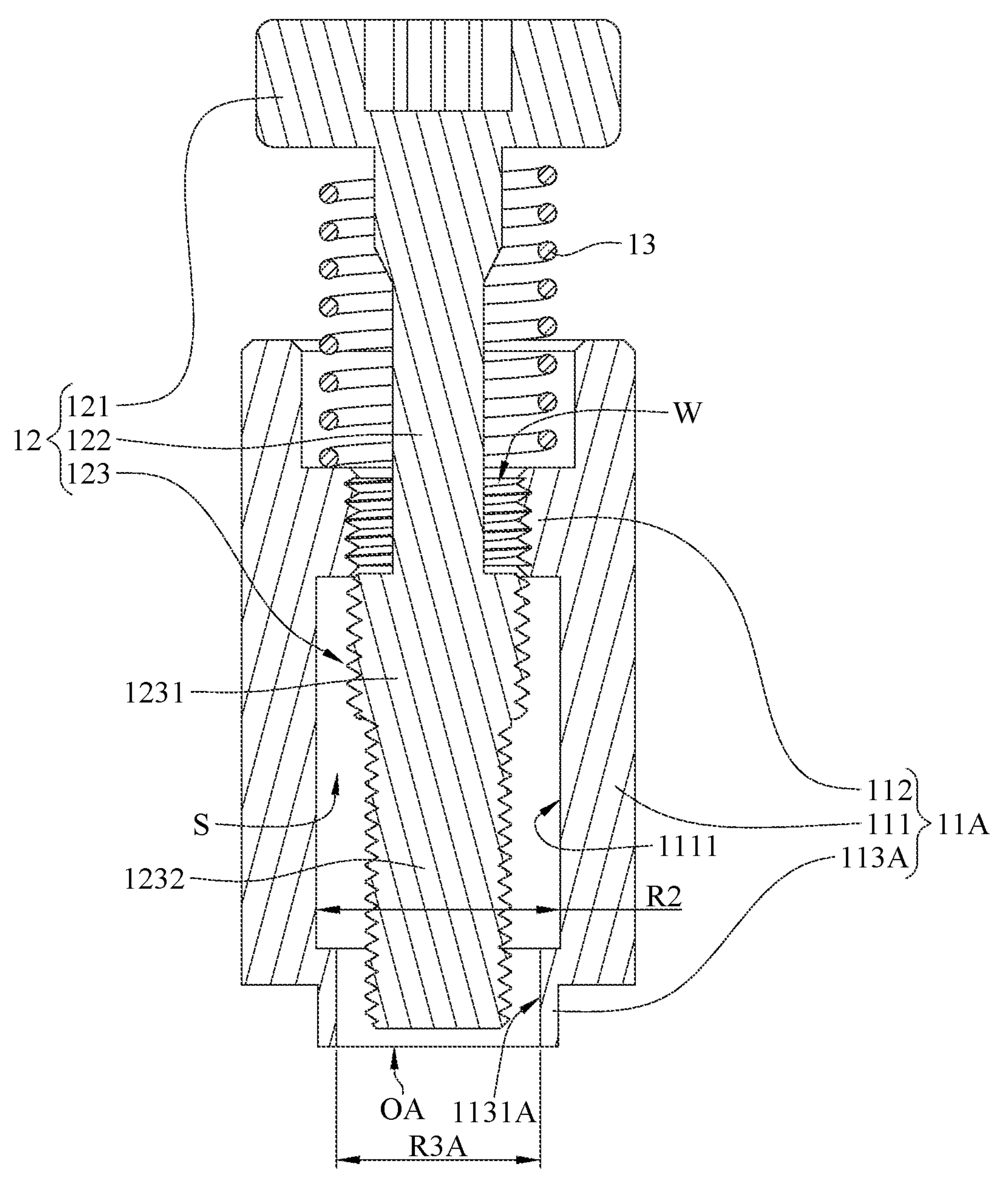
FIG. 8 is a cross-sectional view of a captive screw in accordance with a second embodiment of the disclosure.

In this embodiment, the diameter R3 of the opening O is equal to the diameter R2 of the accommodating space S, but the disclosure is not limited thereto. Other embodiments are described below for illustrative purposes. It is to be noted that the following embodiments use the reference numerals and a part of the contents of the above embodiments, the same reference numerals are used to denote the same or similar elements, and the description of the same technical contents is omitted. For the description of the omitted part, reference may be made to the above embodiments, and details are not described in the following embodiments. Please refer to FIG. 8, which is a cross-sectional view of a captive screw 10A in accordance with a second embodiment of the disclosure. In this embodiment, the diameter R3A of the opening OA may be less than the diameter R2 of the accommodating space S.

Figure 9:
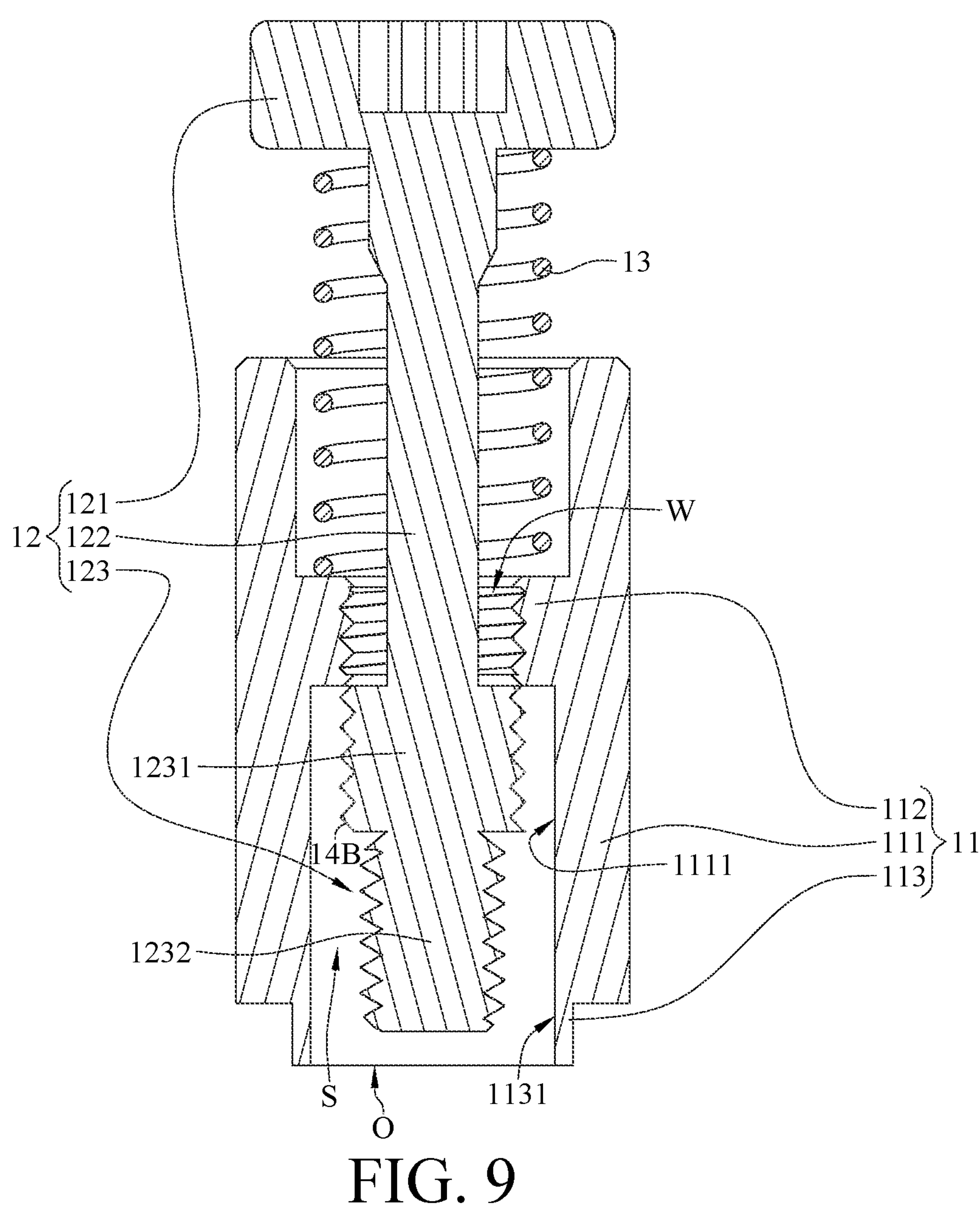
FIG. 9 is a cross-sectional view of a captive screw in accordance with a third embodiment of the disclosure.

Please refer to FIG. 9, which is a cross-sectional view of a captive screw 10B in accordance with a third embodiment of the disclosure. The captive screw 10B of this embodiment is similar to the captive screw 10 of the first embodiment, the main difference between them is that the captive screw 10B of this embodiment further includes a glue layer 14B. The glue layer 14B is disposed on the wider section 1231 of the threaded portion 123, and can absorb a vibration generated by the screwing member 12 screwed to the sleeve 11 so as to prevent the screwing member 12 from being detached from the sleeve 11 due to the vibration generated during screwing.

According to the captive screw as described in the above embodiments, the wider section of the screwing member passes through the channel, and the diameter of the channel is less than the major diameter of the wider section. Therefore, the screwing member can be prevented from being detached from the sleeve via an aforementioned size design without installing additional blocking components. Accordingly, a structure of the captive screw can be simplified so as to facilitate assembly of the captive screw while preventing the screwing member from being lost due to the detachment from the sleeve.

It will be apparent to those skilled in the art that various modifications and variations can be made to the present disclosure. It is intended that the specification and examples be considered as exemplary embodiments only, with a scope of the disclosure being indicated by the following claims.

What is claimed is:

1. A captive screw, comprising:

a sleeve, comprising:

a cylindrical body portion, having an inner surface, wherein the inner surface of the body portion surrounds and forms an accommodating space; and at least one positioning protrusion, protruding from the inner surface of the body portion and forming a channel, wherein a diameter of the channel is less than a diameter of the accommodating space; and a screwing member, comprising a head portion, a neck portion and a threaded portion, wherein the neck portion connects the head portion and the threaded portion, a diameter of the neck portion is less than a diameter of the head portion and the diameter of the channel, the neck portion passes through the channel, and the head portion and the threaded portion are located on two opposite sides of the at least one positioning protrusion, respectively;

wherein the threaded portion comprises a wider section and a narrower section, the wider section is connected to the neck portion, the narrower section is directly connected to the wider section, the wider section and the narrower section each has a threaded profile with a step transition therebetween, the diameter of the channel is less than a major diameter of the wider section, and the diameter of the channel is greater than or equal to a major diameter of the narrower section and a minor diameter of the wider section.

2. The captive screw according to claim 1, further comprising a restoring member, wherein the restoring member is sleeved on the neck portion of the screwing member, and two opposite sides of the restoring member are connected to the head portion of the screwing member and the at least one positioning protrusion of the sleeve, respectively, to be configured to move the head portion away from the at least one positioning protrusion.

3. The captive screw according to claim 1, wherein the sleeve further comprises a mounting portion, the mounting portion is connected to a side of the body portion, and the mounting portion is configured to be mounted on a plate.

4. The captive screw according to claim 3, wherein the mounting portion has an inner surface, the inner surface of the mounting portion surrounds and forms an opening, and a diameter of the opening is less than or equal to the diameter of the accommodating space.

5. The captive screw according to claim 4, wherein the neck portion and the at least one positioning protrusion are spaced apart from each other by a first distance, the wider section and the inner surface of the body portion are spaced apart from each other by a second distance, and the narrower section and the inner surface of the mounting portion are spaced apart from each other by a third distance.

6. The captive screw according to claim 5, wherein the first distance, the second distance and the third distance are greater than or equal to 0.5 millimeters.

7. The captive screw according to claim 1, further comprising a glue layer, wherein the glue layer is disposed on the wider section of the threaded portion.

8. The captive screw according to claim 1, wherein the wider section of the threaded portion conforms to M5 specification, and the narrower section of the threaded portion conforms to M4 specification.

9. The captive screw according to claim 8, wherein the channel is a screw hole, and the channel conforms to M5 specification.

10. The captive screw according to claim 1, wherein the at least one positioning protrusion is annular.

* * * * *